(12) United States Patent
Chang

(10) Patent No.: US 6,739,063 B2
(45) Date of Patent: May 25, 2004

(54) COMBINATION COMPASS

(76) Inventor: Gin-Sung Chang, No. 15, Lane 385, Kuang Ming Rd., Wu Jih Hsiang, Taichung Hsien (TW)

( * ) Notice: Subject to any disclaimer, the term of this patent is extended or adjusted under 35 U.S.C. 154(b) by 0 days.

(21) Appl. No.: 10/237,796

(22) Filed: Sep. 10, 2002

(65) Prior Publication Data

US 2004/0045179 A1 Mar. 11, 2004

(51) Int. Cl.[7] .................... G01C 17/10; G10K 5/00
(52) U.S. Cl. .................. 33/355 R; 33/1 E; 33/275 R; 116/137 R; 446/204
(58) Field of Search ................. 33/355 R, 1 E, 33/355 D, 275 R; 116/137 R; 446/202, 204

(56) References Cited

U.S. PATENT DOCUMENTS

| | | | | |
|---|---|---|---|---|
| 3,085,150 A | * | 4/1963 | Bautsch | 362/200 |
| 4,700,490 A | * | 10/1987 | Kramer et al. | 33/355 D |
| 4,875,147 A | * | 10/1989 | Auer | 362/205 |
| 4,918,775 A | * | 4/1990 | Leu | 7/168 |
| 5,329,872 A | * | 7/1994 | Wright | 116/137 R |
| 5,956,985 A | * | 9/1999 | Chang | 70/456 R |
| 5,975,007 A | * | 11/1999 | Cross | 116/137 R |
| 6,145,209 A | * | 11/2000 | Chang | 33/348 |
| 6,516,526 B1 | * | 2/2003 | Iden | 33/355 R |

\* cited by examiner

Primary Examiner—Christopher W. Fulton
(74) Attorney, Agent, or Firm—Bacon & Thomas, PLLC

(57) ABSTRACT

A combination compass. The compass includes a housing, a compass device mounted inside the housing, a top cover pivoted to one end of the housing and capable of covering over the compass device. The top cover has a mouthpiece, a resonance chamber, an air passage connected between the mouthpiece and the resonance chamber, and a sound producing device disposed in the air passage and adapted to produce sound when the user blows air into the mouthpiece.

11 Claims, 4 Drawing Sheets

COMBINATION COMPASS

BACKGROUND OF THE INVENTION

1. Field of the Invention

The present invention relates to a magnetic compass and, more particularly, to a combination compass, which can also be used as a whistle for producing sound.

2. Description of the Related Art

A conventional magnetic compass is generally comprised of a housing (case), a pivot-pin vertically mounted inside the case, and a magnetic needle supported on the pivot pin for determining direction by means of the induction of the magnetic field of the earth. A rotating dial may be provided and supported on the case for checking the variation between the North Pole and the magnetic north pole. FIG. 1 shows a magnetic compass of this design. As illustrated, the magnetic compass comprises a housing 10, a compass device 20 mounted inside the housing 10, a top cover 30 pivoted to one end of the housing 10, and a sight 40 pivoted to the other end of the housing 10. The sight 40 has a sighting hole 41 and a convex lens 42. The top cover 30 has an aiming hole 31. When in use, the user attaches one eye to the sighting hole 41 to view the object through the aiming hole 31, and then moves the sight to the convex lens 42 to view the graduated dial of the compass device 20 and to read the reading of the azimuth.

The aforesaid magnetic compass is for use outdoors, for example, when climbing mountains or camping. In order to provide more functions, magnetic compasses with scale are disclosed. Similar designs are seen in U.S. Pat. Nos. D411121, D349066 and D369982. These magnetic compasses can also be used to measure the distance from a map, or for drawing lines. When going to have an outdoor activity, one may carry a lot of thins including flashlight, whistle, and etc. It is therefore desirable to have multiple implements combined into a combination device.

The aforesaid magnetic compass has drawbacks recited as follows. The sighting hole of the sight is an elongated slot extended downwards from the top of the sight. When the user attaches one eye to the sighting hole to view the object, a portion of the eye is located above the view hole, which will be easily influenced by the surrounding scene, such that it is not easy to aim the object. Further, in order to avoid the error when aiming the object, the width of the aiming hole is designed as smaller as possible. However, the reflection of light generated at the bottom surface of the top cover around the opening of the aiming hole will also influence the user when the user aiming the small aiming hole.

SUMMARY OF THE INVENTION

The primary objective of the present invention is to provide a combination compass, which can be used as a compass for determining direction as well as a whistle for producing sound.

To achieve this objective of the present invention, the combination compass comprises a housing, a compass device mounted inside the housing, a top cover pivoted to one end of the housing and being capable of covering over the compass device. The top cover has a mouthpiece, a resonance chamber, an air passage connected between the mouthpiece and the resonance chamber, and a sound producing device disposed in the air passage and adapted to produce sound when the user blowing air into the mouthpiece with the mouth.

It is another objective of the present invention to provide a combination compass which is helpful for the user to aim the object. To achieve this objective of the present invention, the combination compass provided by the present invention comprises a sight having a flat sight plate on which a sighting hole is formed. When the user attaches the eye to the sighting hole, the pupil of the eye is masked by the periphery of the flat sight plate so that the eye is free from the interference of surrounding scene when viewing the object. In addition, the top cover of the combination compass is provided with an aiming hole having a first opening on the bottom side of the top cover and a seconding opening on the top side of the top cover. The inner diameter of the aiming hole gradually reduces in direction from the first opening toward the second opening. Therefore, no reflection of light is produced on the inside wall of the aiming hole to influence the user when the user viewing the object through the sight.

DETAILED DESCRIPTION OF THE PREFERRED EMBODIMENT

Figure 1:
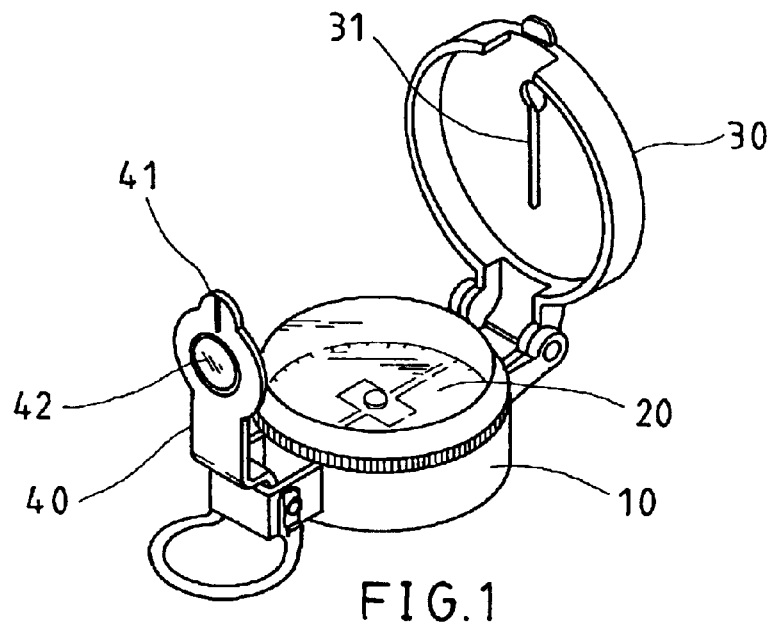
FIG. 1 is a perspective view of a compass according to the prior art.

Referring to FIGS. from 2 through 6, a combination compass 2 is shown comprised of a housing 50, a compass device 60, a top cover 70, and a sight 80.

The housing 50 has a top open chamber 51, a first pivot holder 52 at the first end thereof, and a second pivot holder 53 at the second end thereof.

The compass device 60 comprises a case 61, a dial 62, an ornamental ring 63, and a planar lens 64. The case 61 is comprised of a hollow circular shell 611, a transparent cap 612 covered on the hollow circular shell 611, and a pivot pin 613 provided at the center of the hollow circular shell 611. The dial 62 is comprised of a graduated disk 621, a magnetic needle 622, a ball holder 623, and a ball 624. The graduated disk 621 is peripherally marked with graduations and direction marks. The graduated disk 621 has a center hole 625. The magnetic needle 622 has a center hole 626. The magnetic needle 622 is closely attached to the bottom side of the graduated disk 621, keeping the center hole 626 in axial alignment with the center hole 625 of the graduated disk 621. The needle holder 623 is inserted into the center hole 625 of the graduated disk 621 and the center hole 626 of the magnetic needle 622 and coupled to the graduated disk 621, having a through hole 627 extended through top and bottom sides thereof. The ball 624 is mounted in the through hole 627 of the ball holder 623. The dial 62 is mounted in the case 61. The pivot pin 613 is inserted through the through hole 627 of the ball holder 623 from the bottom to support the ball 624 in the ball holder 623, for enabling the dial 62 to be rotated on the pivot pin 613 freely. Due to the act of the magnetic needle 622 with the magnetic field of the earth, the graduated disk 621 indicates the azimuth of the earth and maintains the indication. Further, the case 61 is filled up with a liquid that prevents the dial 62 from vibration. The ornamental ring 63 is coupled to the topside of the periphery of the case 61. The planar lens 64 is fastened to the ornamental ring 63.

The top cover 70 is comprised of a first cover member 71 and a second cover member 72. The first cover member 71 is shaped like a circular cap having a coupling portion 711 at one end, a topside, and a bottom side. The coupling portion 711 is pivoted to the first pivot holder 52 of the housing 50 by a pivot A so that the first cover member 71 can be turned relative to the housing 50 between the close position where the bottom side of the first cover member 71 closes the top open chamber 51 of the housing 50, and the open position where the bottom side of the first cover member 71 is moved away from the top open chamber 51 of the housing 50. The first cover member 71 further comprises a protruded lip 712 at the other end opposite to the coupling portion 711, atop coupling, flange 713 of substantially U-shaped profile protruded from the top side and extended from one side of the protruded lip 712 and terminating in the other side of the protruded lip 712, a gap 714 defined between the ends of the top coupling flange 713 above the protruded lip 712, and a triangular block 715 disposed adjacent to the gap 714. The triangular block 715 has a top side extended upwards from the top side of the first cover member 71 adjacent to the gap 714 and then sloping downwards toward the space surrounded by the top coupling flange 713.

The second cover member 72 fits the U-shaped profile of the top coupling flange 713, comprising a bottom coupling flange 721 adapted for coupling to the top coupling flange 713 of the first cover member 71, and a gap 722 corresponding to the gap 714 of the first cover member 71. When the bottom coupling flange 721 of the second cover member 72 fastened to the top coupling flange 713 of the first cover member 71, the lip 712 of the first cover member 71 forms with one end of the second, cover member 72 a mouthpiece 73, the gap 714 and the gap 722 form a mouth hole 731 surrounded by the mouthpiece 73, the top side of the triangular block 715 and the bottom side of the second cover member 72 define an air passage 74, and the top coupling flange 713 of the first cover member 71 defines with the bottom side of the second cover member 72 a resonance chamber 75. Further, the second cover member 72 has two parallel air outlets 723 corresponding to the ridge of the top side of the triangular block 714 in communication with the end of the air passage 74, so that when an air stream passed from the mouth hole 731 through the air passage 74 to the air outlets 723, the air steam is disturbed, producing sound, i.e., the air outlets 723 form a sound producing device.

Further, the top cover 70 provides an aiming hole 76 formed of a first hole 761 in the first cover member 71 and a second hole 762 in the second cover member 72. The first hole 761 is formed of a first opening 763 and a second opening 764. The first opening 763 is relatively greater. The second opening 764 is a tapered opening gradually reducing from the first opening 763 toward the second hole 762. When the second cover member 72 fastened to the first cover member 71, the second hole 762 is connected to the second opening 764 of the first hole 761, forming the aiming hole 76.

Figure 7:
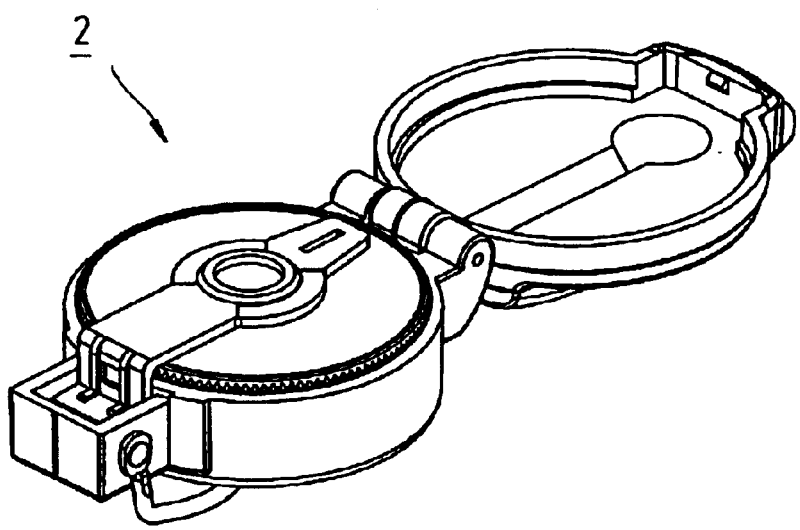
FIG. 7 is another perspective view of the present invention, showing the top cover opened and set in a horizontal position and the sight closed.

The sight 80 has one end terminating in a knuckle 81, which is pivoted to the second pivot holder 53 of the housing 50 for enabling the sight 80 to be turned relative to the housing 50 between the first position where the bottom side of the sight 80 is closely attached to the top side of the housing 50 (see FIG. 7) and the second position where the sight 80 and the housing 50 are disposed at right angles (see FIG. 2), a top side, a bottom side, a circular hole 82 extended through the top and bottom sides, a biconvex magnifying glass 90 mounted in the circular hole 82, via hinge 81 an opposite end terminating in a flat sight plate 83, and an elongated sighting hole 831 in the flat sight plate 83.

The operation of the combination compass 2 is outlined hereinafter. When not in use, the combination compass 2 is received, keeping the sight 80 in the first position, i.e., the bottom side of the sight 80 is kept closely attached to the topside of the housing 50, and the top cover 70 is closed on the housing 50 over the sight 80.

Figure 2:
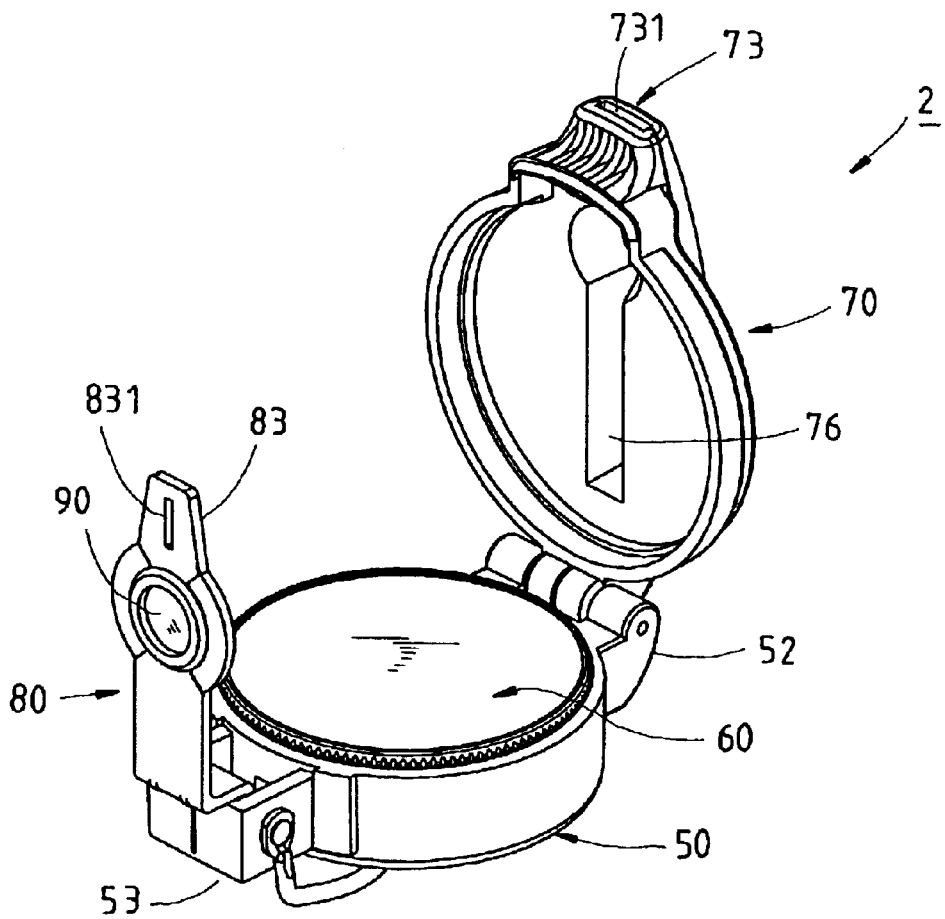
FIG. 2 is a perspective view of a combination compass according to the present invention.
Figure 3:
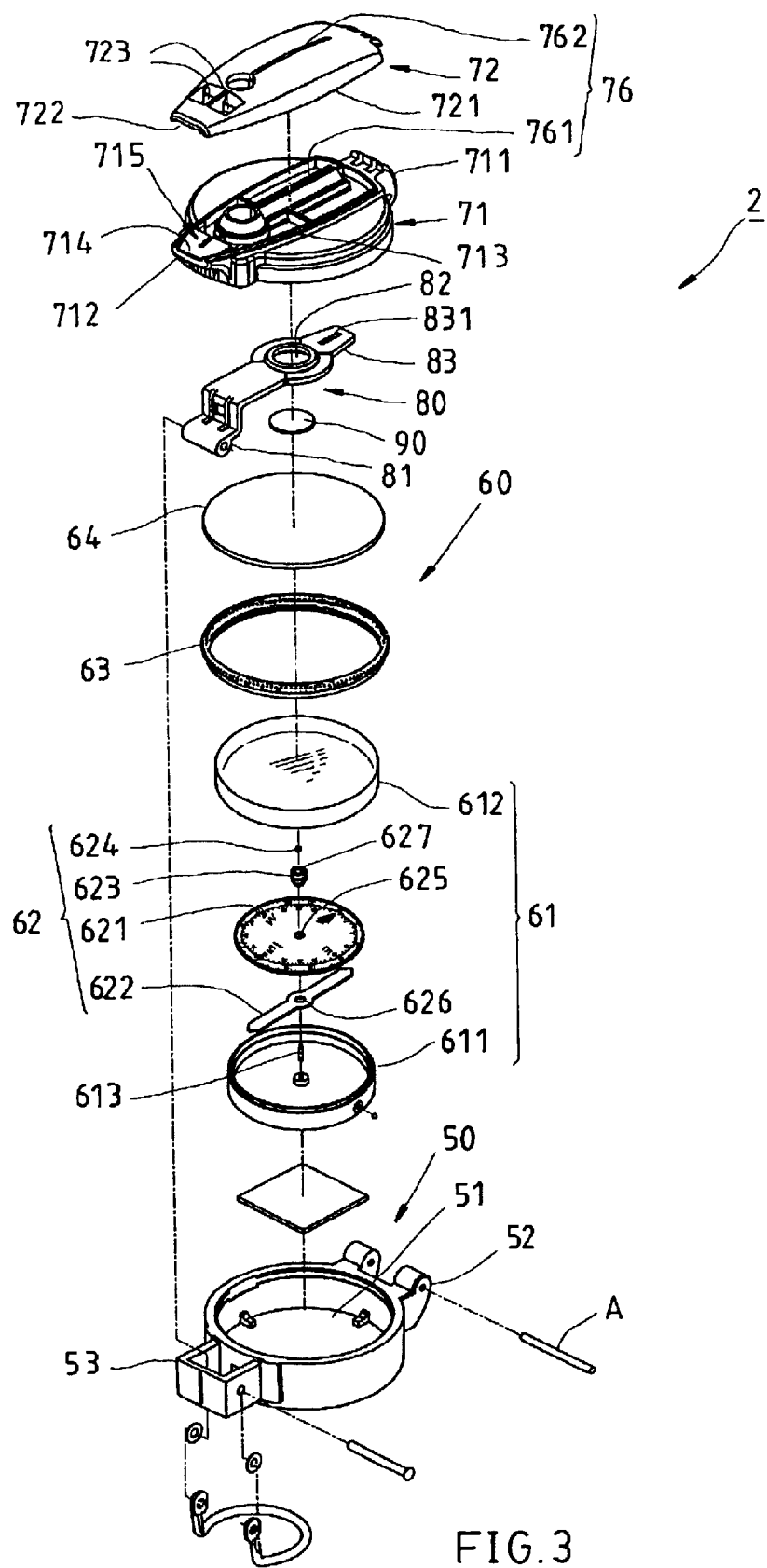
FIG. 3 is an exploded view of the combination compass according to the present invention.
Figure 4:
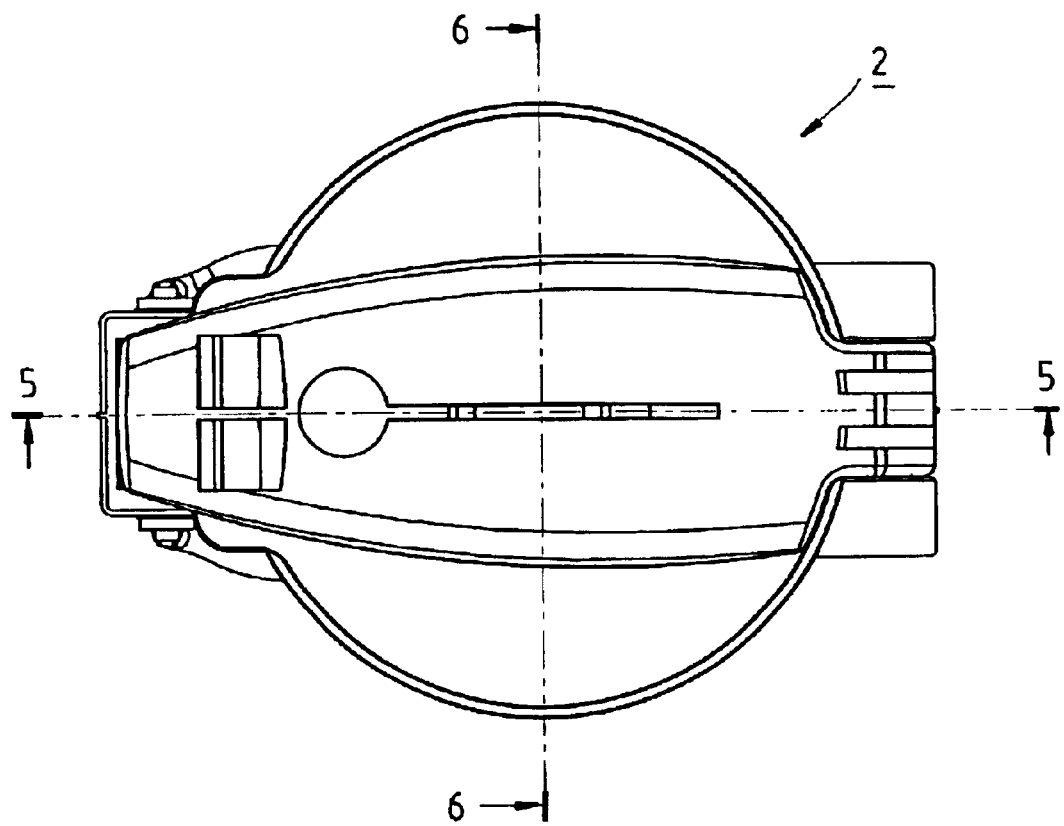
FIG. 4 is a top view of the combination compass according to the present invention.
Figure 5:
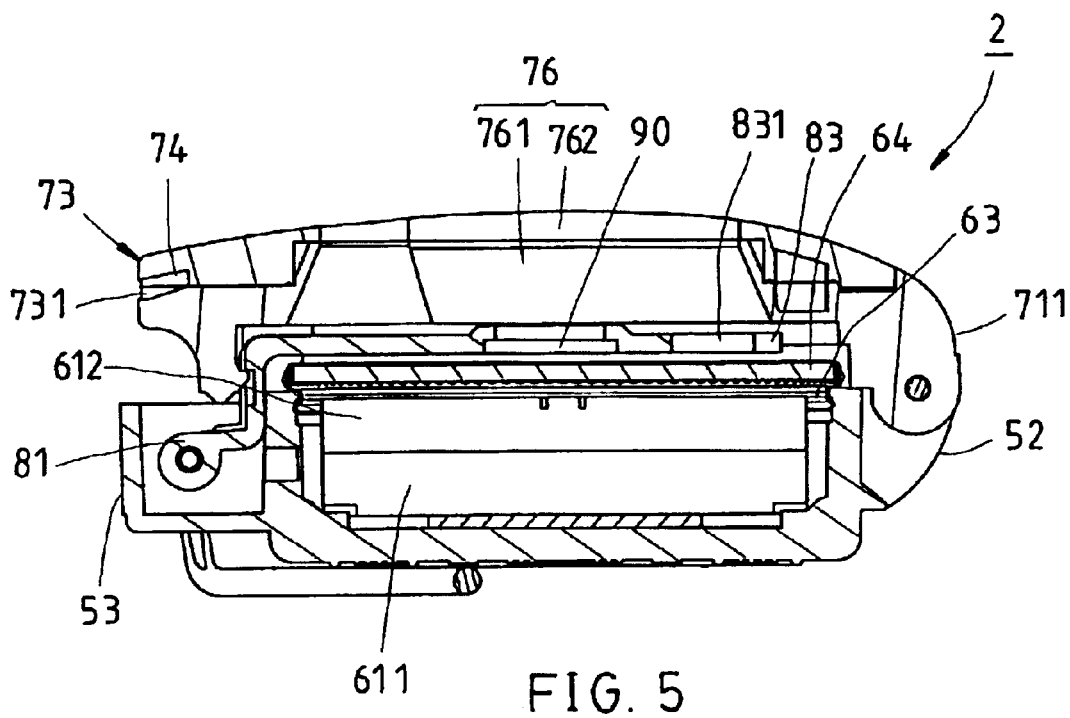
FIG. 5 is a sectional view taken along line 5—5 of FIG. 4.
Figure 6:
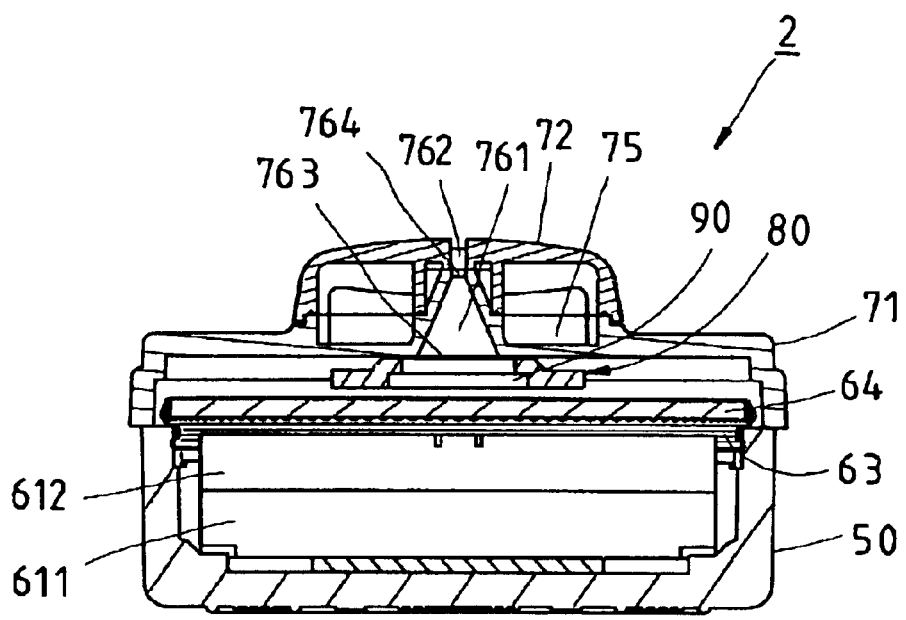
FIG. 6 is a sectional view taken along line 6—6 of FIG. 4.

When in use, the top cover 70 is opened from the housing 50 and turned to a vertical position, perpendicular to the housing 50 (see FIG. 2), and then the sight 80 is turned from the first position to the second position and maintained in parallel to the top cover 70 (see FIG. 2). The sight 80 is then moved toward one eye of the user, for enabling the user to view the object through the sighting hole 831 of the sight 80 and the aiming hole 76 of the top cover 70, and then the user moves the same eye to the biconvex magnifying, glass 90 to view the graduated disk 621 through the biconvex magnifying glass 90 and to read the azimuth from the graduations, of thee graduated disk 621. This azimuth reading procedure is; similar to the conventional designs.

Because the sighting hole 831 is formed in the flat sight plate 83 of the sight 80, when the user attached the eye to the sighting hole 831, the pupil of the eye is masked by the periphery of the sighting hole 831 of the flat sight plate 83 so that the eye is free from the interference of surrounding scene when viewing the object.

Further, because the first opening 763 of the aiming hole 76 faces the sight 80, and because the inner diameter of the aiming hole 76 gradually reduces in direction from the first opening 763 toward the second opening 764, the inside wall of the aiming hole 76 is not perpendicular to the sight of the eye. Therefore, no reflection of light is produced when the user viewing the object through the sight 80.

In addition to the aforesaid sighting function, the user can hold the mouthpiece 73 with the mouth and blow air through the mouth hole 731 toward the air outlets 723 via the air passage 74, to produce sound. The resonance chamber 75 reinforces and prolongs the sound. In general, the combination compass can also be used as a whistle.

What the invention claimed is:

1. A combination compass comprising:
   a housing having a first end;
   a compass device mounted inside said housing;
   a top cover pivoted to the first end of said housing and being, capable of covering over said compass device, said top cover having a mouthpiece, a resonance chamber, an air passage connected between said mouthpiece and said resonance chamber, and a sound producing device disposed in said air passage and adapted to produce sound when a user blows air into said mouthpiece;
   said top cover comprises a first cover member, and a second cover member fastened to said first cover member and forming with said first cover member said mouthpiece, said air passage, said sound producing device, and said resonance chamber; and
   said top cover further comprises an aiming hole, the aiming hole of said top cover being formed of a first hole formed in said first cover member and a second hole formed in said second cover member, said first hole being formed of a first opening and a second opening, said first opening being relatively greater than said second opening, said second opening being a tapered opening gradually reducing from said first opening toward said second hole through said sound producing device.

2. The combination compass as claimed in claim 1, wherein said housing comprises a first pivot holder disposed at said first end, and said top cover comprises a coupling portion pivoted to the first pivot holder of said housing by a pivot.

3. The combination compass as claimed in claim 2, wherein said housing further comprises a second end, a second pivot holder disposed at said second end, a sight, said sight comprising a knuckle disposed at one end thereof and pivoted to said second pivot holder by a pivot and a sighting hole.

4. The combination compass as claimed in claim 3, wherein said sight comprises a flat sight plate, and the sighting hole of said sight is an elongated hole formed in said flat sight plate.

5. The combination compass as claimed in claim 3, wherein said sight comprises a circular hole and a biconvex magnifying glass mounted in said circular hole.

6. The combination compass as claimed in claim 3, wherein said first hole having a caliber greater than said second hole.

7. The combination compass as claimed in claim 1, wherein said housing comprises a first pivot holder disposed at said first end, and said first cover member comprises a coupling portion pivoted to the first pivot holder of said housing by a pivot.

8. The combination compass as claimed in claim 7, wherein said first cover member comprises a lip protruded from one end thereof remote from said coupling portion, a top coupling flange of substantially U-shaped profile protruded from a top side thereof and extended from one side of said and terminating in an opposite side of said lip, a gap defined between two distal ends of said top coupling flange above said lip, and a triangular block disposed adjacent to said gap, said triangular block having a top side extended upwards from a top side of said first cover member adjacent to said gap and then sloping downwards toward the space surrounded by said top coupling flange, and two parallel air outlets corresponding to the topmost edge of the top side of said triangular block in communication with said air passage; said second cover member comprises a bottom coupling flange coupled to the top coupling flange of said first cover member, and a gap corresponding to the gap of said first cover member; the lip of said first cover member forms with one end of said second cover member said mouthpiece, the gap of said first cover member and the gap of said second cover member form a mouth hole surrounded by said mouthpiece; the top side of said triangular block defines with a bottom side of said second cover member said air passage; the top coupling flange of said first cover member defines with a bottom side of said second cover member said resonance chamber; said parallel air outlets form said sound producing device.

9. The combination compass as claimed in claim 1, wherein said compass device comprises a case, and a dial, said case being comprised of a hollow circular shell, a transparent cap covered on said hollow circular shell, and a pivot pin provided at the center of the hollow circular shell, said dial being comprised of a graduated disk, a magnetic needle, a ball holder, and a ball, said graduated disk having graduations and direction marks on the periphery thereof, said graduated disk having a center hole, said magnetic needle having a center hole, said magnetic needle being attached to a bottom side of said graduated disk keeping the center hole of said magnetic needle in axial alignment with the center hole of said graduated disk, said ball holder being inserted into the center hole of said graduated disk and the center hole of said magnetic needle and coupled to said graduated disk, said ball holder having a through hole extended through top and bottom sides thereof, said ball being mounted in the through hole of said ball holder, said dial being mounted in said case, said pivot pin being inserted through the through hole of said ball holder from a bottom to support said ball in said ball holder for enabling said dial to be rotated on said pivot pin freely.

10. The combination compass as claimed in claim 9, wherein said case is filled up with a liquid to support said graduated disk against vibration.

11. The combination compass as claimed in claim 9, further comprising an ornamental ring fastened to the periphery of said case at a top side thereof, and a planar lens fastened to said ornamental ring.

* * * * *